United States Patent
Jover Segura et al.

(10) Patent No.: US 9,549,368 B2
(45) Date of Patent: Jan. 17, 2017

(54) GATEWAY RESELECTION (71) Applicant: BRITISH TELECOMMUNICATIONS PUBLIC LIMITED COMPANY, London (GB)

(72) Inventors: Xavier Jover Segura, London (GB); Maria Cuevas, Madrid (ES)

(73) Assignee: BRITISH TELECOMMUNICATIONS public limited company, London (GB)

( * ) Notice: Subject to any disclaimer, the term of this patent is extended or adjusted under 35 U.S.C. 154(b) by 30 days.

(21) Appl. No.: 14/389,534

(22) PCT Filed: Mar. 27, 2013

(86) PCT No.: PCT/GB2013/000137
§ 371 (c)(1),
(2) Date: Sep. 30, 2014

(87) PCT Pub. No.: WO2013/144546
PCT Pub. Date: Oct. 3, 2013

(65) Prior Publication Data
US 2015/0063249 A1 Mar. 5, 2015

(30) Foreign Application Priority Data
Mar. 30, 2012 (EP) .................................. 12250088

(51) Int. Cl.
H04W 48/18 (2009.01)
H04L 29/08 (2006.01)
(Continued)

(52) U.S. Cl.
CPC .............. *H04W 48/18* (2013.01); *H04L 67/18* (2013.01); *H04L 67/2842* (2013.01);
(Continued)

(58) Field of Classification Search
CPC ...... H04L 61/609; H04L 67/18; H04L 67/327; H04L 67/2842; H04L 29/08; H04W 4/02; H04W 4/021; H04W 4/023; H04W 36/12; H04W 36/32; H04W 48/18; H04N 21/47202
(Continued)

(56) References Cited

U.S. PATENT DOCUMENTS 6,952,712 B2 * 10/2005 Yoshimura ........ G06F 17/30902
707/E17.12
7,707,271 B2 * 4/2010 Rudkin ................. H04L 65/605
370/401
(Continued)

FOREIGN PATENT DOCUMENTS

WO 2011/091861 8/2011

OTHER PUBLICATIONS

Kuz, Ihor Theodore, "An Approach to a Scalable Wide-Area Web Service", dissertation, 2003 (238 pgs).
(Continued)

Primary Examiner — Tri H Phan
(74) Attorney, Agent, or Firm — Nixon & Vanderhye P.C.

(57) ABSTRACT

A method of managing a data connection between a user device and a network of content caches, the user device and content caches being connectable via a network of gateway servers. The method comprising: in response to a request for content data issued by the user device, receiving content location data stored within at least one content cache from a content locator unit; determining which one of the caches is the closest to the user device; determining whether the packet data connection could be better served using a different gateway server; and if it is determined that a different gateway server should be used, causing the current data connection to move from the current gateway server to the different gateway server.

17 Claims, 7 Drawing Sheets (51) Int. Cl.
*H04W 4/02* (2009.01)
*H04W 36/12* (2009.01)
*H04W 36/32* (2009.01)

(52) U.S. Cl.
CPC .......... *H04W 4/021* (2013.01); *H04W 36/12* (2013.01); *H04W 36/32* (2013.01); *H04W 4/023* (2013.01)

(58) Field of Classification Search
USPC .......... 370/396–410; 709/217–226, 238–245
See application file for complete search history.

(56) References Cited

U.S. PATENT DOCUMENTS

| | | | | |
|---|---|---|---|---|
| 8,924,508 | B1* | 12/2014 | Medved | H04L 29/08072 709/217 |
| 9,203,636 | B2* | 12/2015 | Stolorz | H04L 12/2602 |
| 2002/0027567 | A1* | 3/2002 | Niamir | G06F 17/30867 715/738 |
| 2003/0105925 | A1* | 6/2003 | Yoshimura | G06F 17/30902 711/118 |
| 2005/0071421 | A1* | 3/2005 | Calo | G06Q 30/0273 709/203 |
| 2006/0020547 | A1* | 1/2006 | Lipsanen | H04N 7/17336 705/51 |
| 2006/0206586 | A1* | 9/2006 | Ling | H04L 29/12113 709/219 |
| 2011/0145317 | A1 | 6/2011 | Serban et al. | |
| 2011/0292912 | A1 | 12/2011 | Zembutsu et al. | |
| 2012/0064908 | A1 | 3/2012 | Fox et al. | |
| 2012/0165036 | A1* | 6/2012 | Shook | H04W 4/02 455/456.1 |
| 2015/0134767 | A1* | 5/2015 | L'Heureux | H04L 65/60 709/213 |

OTHER PUBLICATIONS

International Search Report for PCT/GB2013/000137, mailed May 3, 2013.

* cited by examiner

| | 83 | 85 | 87 | 89 |
|---|---|---|---|---|
| 81 | Mobile device IP address | Cache ID #1 | Location (IP Address) | Load |
| | | 25a | 10.12.1.4 | 5 |
| | 10.10.1.148 | 25b | 10.13.1.4 | 3 |
| | | 27b | 10.14.1.4 | 1 |

GATEWAY RESELECTION

This application is the U.S. national phase of International Application No. PCT/GB2013/000137 filed 27 Mar. 2013 which designated the U.S. and claims priority to EP Patent Application No. 12250088.7 filed 30 Mar. 2012, the entire contents of each of which are hereby incorporated by reference.

The present invention relates to data networks and in particular to gateway selection in a network core.

INTRODUCTION

Within cellular data networks, the typical architecture includes an access network of cellular base stations connected to a network core via gateways. Data packets are then transported across the core to external networks such as content delivery networks.

As usage of the networks increases, there is a need to optimise the flow path of data across the various parts of the network. Content cache techniques rely on data replication and locality to improve the accessibility to data. In this way, a requesting device can be redirected to the closest cache in the data network which contains that data.

Whilst caching can improve the speed of data retrieval, in such conventional networks, there is no further optimisation of the data path. The present invention addresses this issue.

STATEMENTS OF INVENTION

In one aspect, the present invention provides a method of managing a data connection between a user device and a plurality of gateways each providing access to resources on a data network, the user device being connected to the data network via a first gateway, the method comprising: determining the location of the resource and switching to a data connection via a second gateway if a distance between the location of the user device and the location of the resource via the second gateway is less than the distance via the first gateway.

In another aspect, the present invention provides a method of managing a data connection between a user device and a network of content caches, the user device and content caches being connectable via a network of gateway servers, comprising: in response to a request for content data issued by the user device, receiving content location data stored within at least one content cache from a content locator unit; determining which one of the caches is the closest to the user device; determining whether the packet data connection could be better served using a different gateway server; and if it is determined that a different gateway server should be used, causing the current data connection to move from the current gateway server to the different gateway server.

FIGURES

Embodiments of the invention will now be explained with the aid of the accompanying figures in which.

DESCRIPTION

Figure 1:
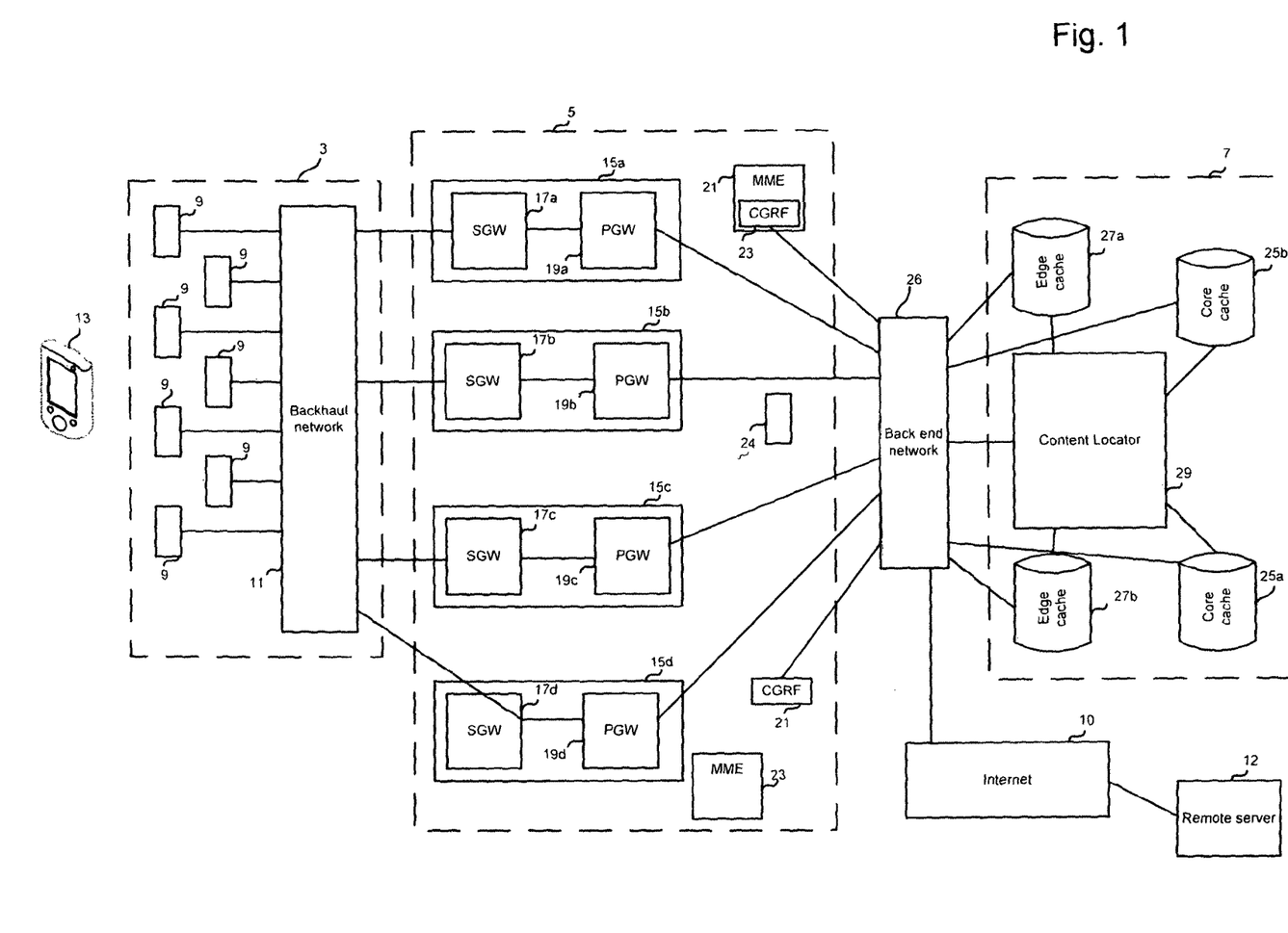
FIG. 1 is an overview of the network architecture in accordance with a first embodiment of the invention.

FIG. 1 is an overview of the network architecture in accordance with a first embodiment of the invention. The network architecture can be divided into three main parts: a cellular access network 3, a network core 5 and a content delivery network 7.

The cellular access network 3 is formed of many cellular base stations 9 located across a geographical area and connected to a backhaul network 11 which in turn connects to components in the network core 5. User devices 13 communicate with the cellular base stations 9, which in this case are "Evolved Node B"s (eNodeB), using a cellular wireless data protocol such as Long Term Evolution (LTE).

The network core 5 is an Evolved Packet Core (EPC) 5 conforming to the Long Term Evolution (LTE) standard. The EPC 5 contains two main components, a Serving Gateway (SGW) 17 and a Packet Data Network Gateway (PGW) 19. Each SGW 17 routes and forwards user data packets from a user device 13 while each PGW 19 is linked to the SGW 17 within the EPC network 5 and provides connectivity to external networks such as the content delivery network 7 and remote servers 12 located on a wide area network such as the Internet 10. In this embodiment, the SGW 17 and PGW 19 are paired and will be referred to hereinafter as a gateway pair 15. Furthermore, in this embodiment, there are four such gateway pairs 15a, 15b, 15c, 15d located in different parts of the geographical area and each typically servicing a different subset of the cellular base stations 9.

The EPC network core 5 also contains a number of management modules, each known as a Mobile Management Entity (MME) 21. Each MME 21 is responsible for authenticating user devices onto the network core 5 by reference to a Home Subscriber Server (not shown) and controlling the user device 13 connections within the network core 5. When a user device 13 has connected to a base station 9 within the cellular access network 3, the base station 9 forwards the access request to the MME 21 which authenticates the user device 13. If the user device 13 is authorised, then it selects one of the gateway pairs 15 to service the data connection for the user device 13.

Typically, the selected gateway pair 15 is maintained for the duration of the data session. However in this embodiment, the MME 21 also includes a Content-based Gateway Reselection Function (CGRF) module 23 which is responsible for moving the data connection between the user device 13 and the gateway pair 15 which was initially selected by the MME 21 when it determines that the data connection would be more efficiently handled by a different gateway pair 15. The operation of the CGRF 23 will be described in more detail later. The EPC 5 also includes a network location server 24 which stores details of the network location (i.e. IP address) and geographical location of each component in the network as well as the overall network topology. It is accessed by the CGRF 23 as will be described later.

Each PGW 19 connects to the content delivery network 7 and Internet 10 via a back end network 26. The content delivery network 7 contains a number of content delivery cache devices also located in different geographical locations, some of which are coincident with the various gateway pairs 15. In this embodiment, the content delivery caches can be grouped into core content delivery caches 25 and edge content delivery caches 27. The core content delivery caches 25 are larger and contain more content whilst edge content delivery caches 27 have a smaller capacity but are located much closer to the gateway pairs 15 and in some cases are co-located with the gateway pairs 15. Each content delivery cache is also connected to the back end network 26 so that data connections between user devices 13 and content delivery caches 25, 27 can be established.

The content delivery network 7 also contains a content locator 29 which is responsible for maintaining a directory of where content is located including coordinating the movement of content between the content delivery caches 25, 27, and for intercepting user device 13 requests for information and if the content is available within the content delivery network, redirecting the content request to an appropriate content delivery cache 25, 27. As will be explained later, it also provides information to the CGRF so that the CGRF can optimise the path between the user devices 13 and content delivery caches 25, 27 via an appropriate gateway pair 15.

Figure 2:
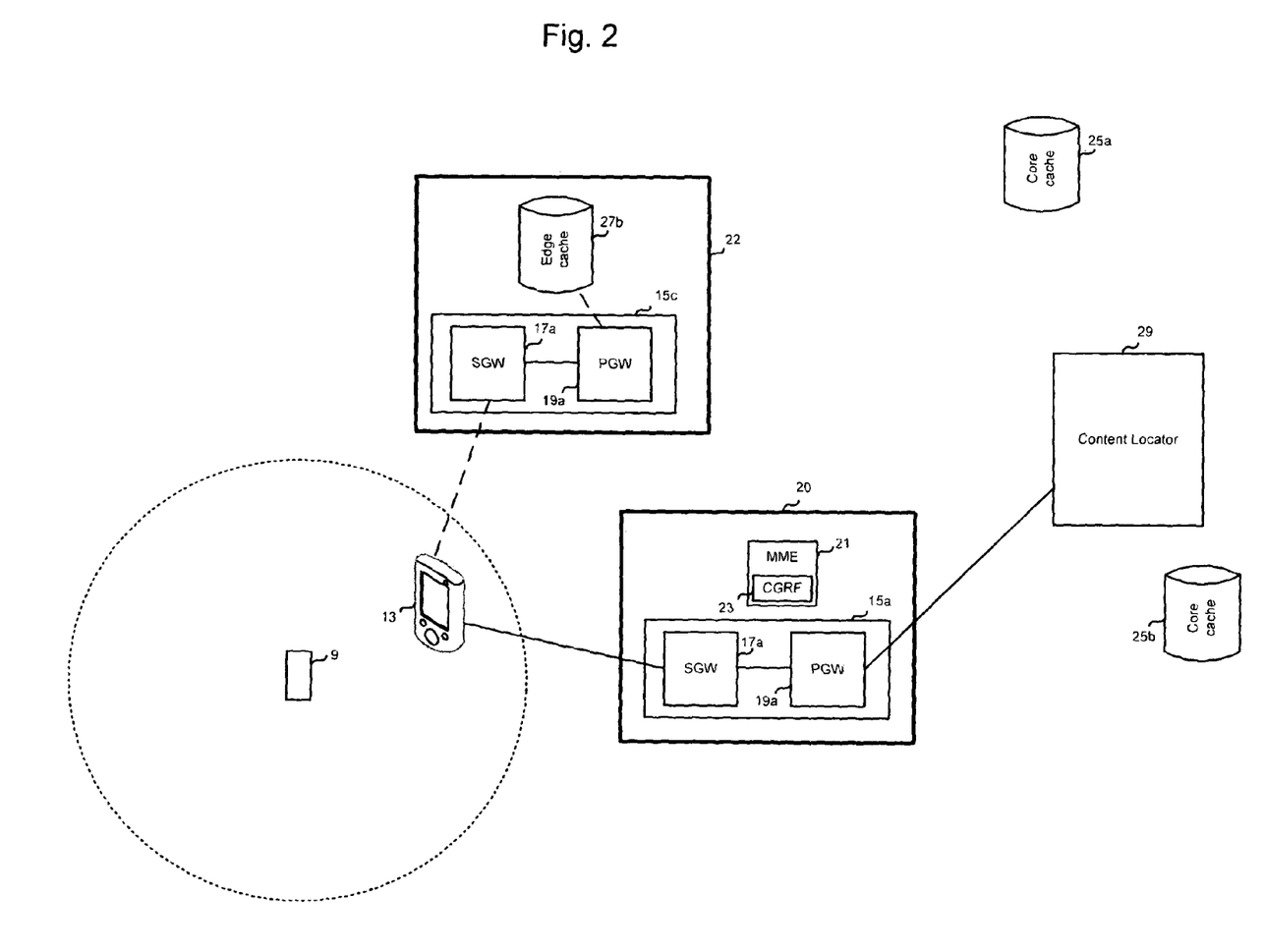
FIG. 2 is a geographical view of the network architecture illustrated in FIG. 1.

For ease of understanding, FIG. 2 shows part of the network architecture 1 explained above from a geographical perspective. In FIG. 2, the mobile device 13 is within range of, and connected to a base station 9. FIG. 2 also shows two Gateway pairs 15a and 15c located near the mobile device 13. In addition, some of the other network devices shown in FIG. 1 are co-located with the gateway pairs 15. The gateway pair 15a, MME 21 and CGRF 23 are located in a building 20. The gateway pair 15c and edge content delivery cache 27b are located in a building 22. The content locator 29 and core content delivery caches 25a, 25b are located at a remote location from the mobile device 13 and buildings 20 and 22.

Figure 3:
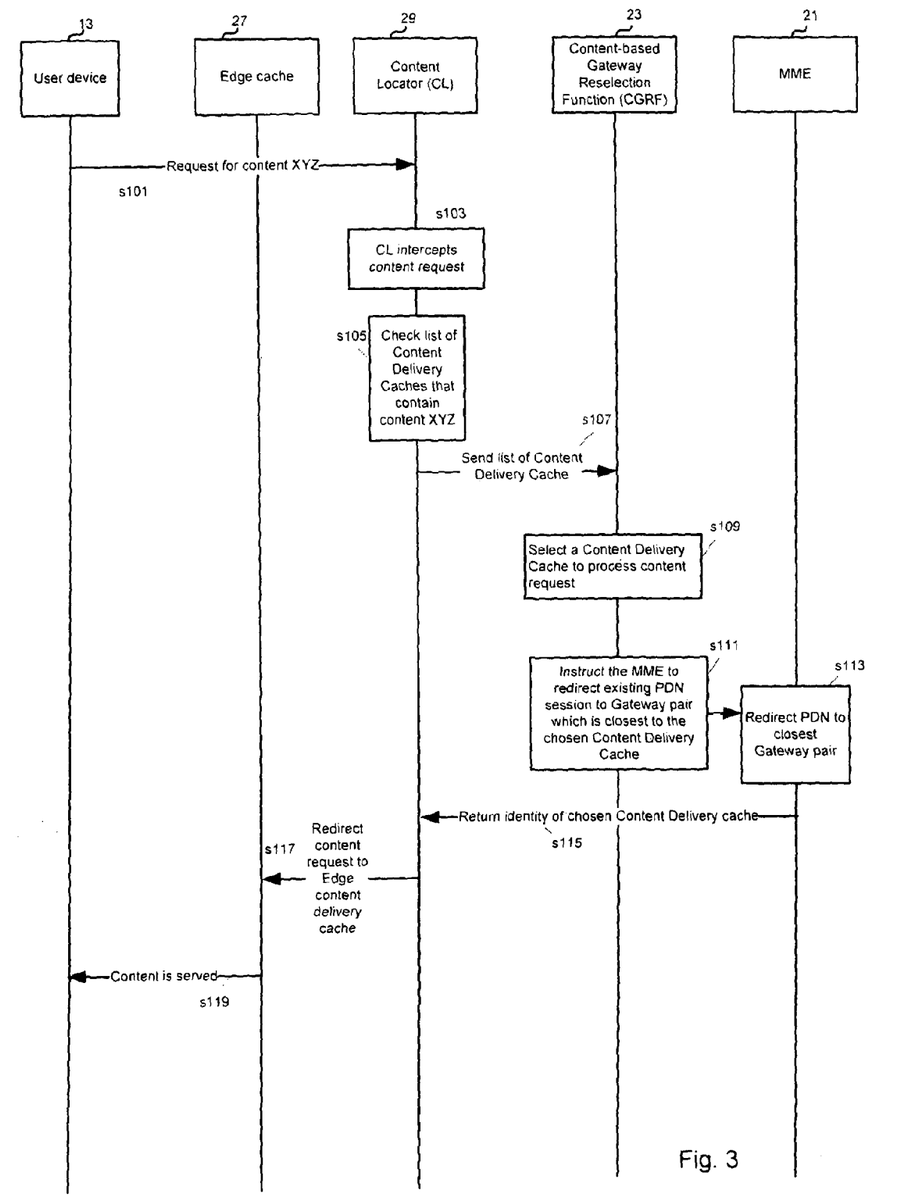
FIG. 3 is an overall view of the processing performed by each component in the network architecture illustrated in FIG. 1.

Following authentication by the MME 21, the mobile device 13 is connected to gateway pair 15a, The overall operation of the first embodiment will now be described with reference to the example scenario shown in FIG. 2 and with reference to FIG. 3 which shows the message flow between components in the network.

In step s101, the user device 13 sends a request for a piece of content to a remote server 12 located on the Internet 10. This message is intercepted by the content locator 29 enroute to the remote server 12 in step s103. The content locator sits on the path between the PGW 19 and the core network so it can read all traffic flowing through the PGW in a similar manner to deep packet inspectors.

In step s105, the content locator 29 checks the content delivery network 7 and specifically the edge and core content delivery caches 25, 27, to see whether the requested content is available and therefore could be delivered to the user device from one of the content delivery caches 25, 27. In the example, core content delivery caches 25a and 25b and edge content delivery cache 27b have cached the request content.

Instead of simply redirecting the user device's request to the nearest content delivery cache as is conventional, in step s107, the content locator 29 helps the CGRF 23 improve the overall routing of data connection between the mobile device 13 and the content delivery cache. It therefore sends a list of the content delivery caches containing the requested content to the CGRF 23 within the EPC 5.

In step s109, the CGRF 23 uses knowledge of the geographical locations of the gateway pairs, content delivery caches and the user device, as well as routing costs, to determine a nearest content delivery cache 25 and an associated gateway pair 15 within the EPC would best serve the content request to the user device. In this example, edge content delivery cache 27b contains the requested content and is in the same building 22 as gateway pair 15c which is near the mobile device 13.

In step s111, the CGRF 23 instructs the MME 21 to redirect the PDN session to the selected gateway pair 15c which is associated with the closest content delivery cache, i.e. edge content delivery cache 27b.

In step s113, the MME 21 moves the PDN session to gateway pair 15c and in step s115 the CGRF 23 notifies the content locator 29 that edge content delivery cache 27b was selected to serve the requested content.

In response to the notification from the CGRF, in step s117 the content locator 29 redirects the user device's content request to the selected content delivery cache 27b.

In step s119 the content delivery cache 27b serves the content as if it were the original destination of the content request. FIG. 2 also shows the new connection between the mobile device 13 and the edge content delivery cache 27b via the gateway pair 15c as a result of the operation of the CGRF and MME redirection.

With the above processing, the route between the user device 13 and requested content is optimised within the content distribution network 7 and also within the EPC network 5.

Figures 4, 5:
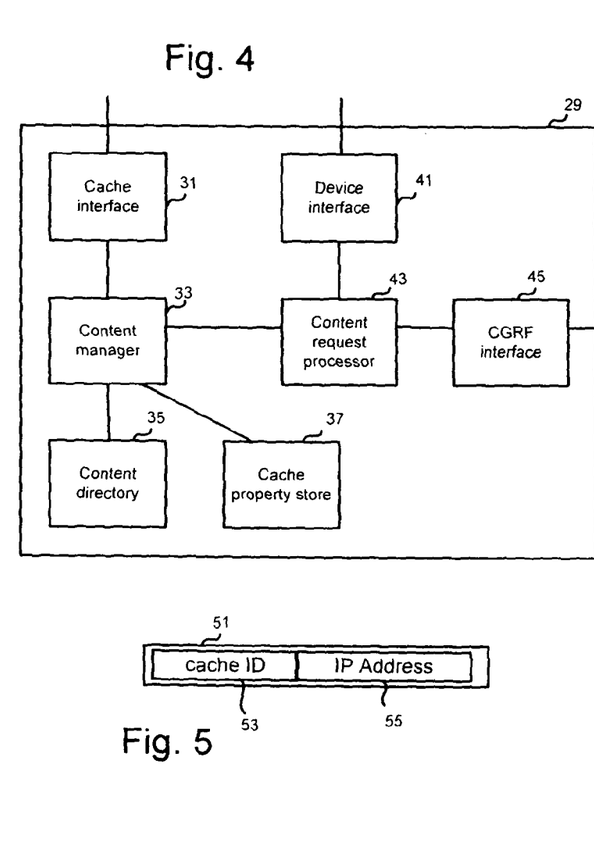
FIG. 4 schematically shows the functional components of a content locator illustrated in FIG. 1.
FIG. 5 shows the format of a content delivery cache registration message.

FIG. 4 schematically shows the functional components of a content locator 29 illustrated in FIG. 1. To maintain knowledge of the state of the content delivery caches in the content delivery network 7, the content locator 29 contains a content delivery cache network interface 31, a content manager 33, a content directory 35 and a content delivery cache property store 37. To handle requests from user devices 13, the content locator 29 also contains a device interface 41, a content request processor 43 and a CGRF interface 45.

The content delivery cache interface 31 is connected within the content delivery network 7 to each of the core content delivery caches 25 and edge content delivery caches 27. Each content delivery cache 25, 27 sends status update information messages to keep the content locator 29 informed of the state of the content delivery network 7. This is conventional processing as will be described below.

FIG. 5 shows a content delivery cache registration message 51 sent from a content delivery cache 25, 27 when it is initialised or joins the content delivery network 7. The message 51 contains an identity field 53 containing the unique identifier for that content delivery cache 25, 27 as well as ann IP address field 55 which provides the IP address of the content delivery cache 25, 27. When the content delivery cache interface 31 receives the registration message 51 the messages are forwarded to the content manager 33 which creates a new entry in the content delivery cache property store 37.

Figure 6:
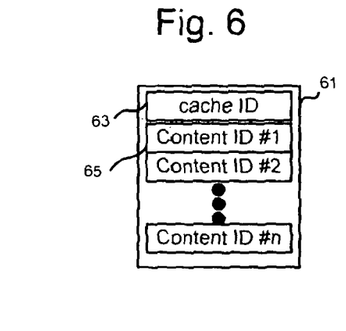
FIG. 6 shows the format of a content delivery cache content update message sent from content delivery caches in the CDN to the content locator.

After this initial registration, the content delivery cache 25, 27 periodically sends content update messages to the content locator 29. FIG. 6 shows the format of the content update message 61 which contains a content delivery cache identity field 63 followed by content entries 65 of the content within the content delivery cache 25, 27. On receiving this message, the content manager 33 updates the content directory 35. Due to the nature of the content delivery network 7, each piece of content should be replicated several times within the network 7 on different content delivery caches.

Figure 7:
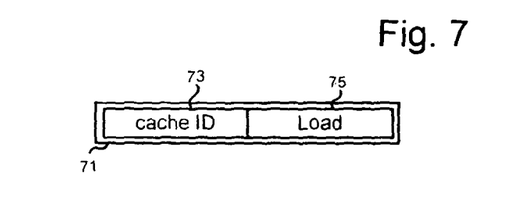
FIG. 7 shows the format of a content delivery cache load message sent from each content delivery cache to the content locator.

The content delivery caches 25, 27 also provide the content locator with their current load status and these messages are sent separately because they are sent more frequently that the content update messages. FIG. 7 shows the format of a load update message 71 which contains a content delivery cache identity field 73 and a content delivery cache load field 75. When such a message is received, the content manager 33 updates the content delivery cache property store 37.

The above components and processing of the content locator 29 enable it to maintain knowledge of the status of the content delivery caches 25 and 27 and the location of content within the content delivery network 7.

Figure 8:
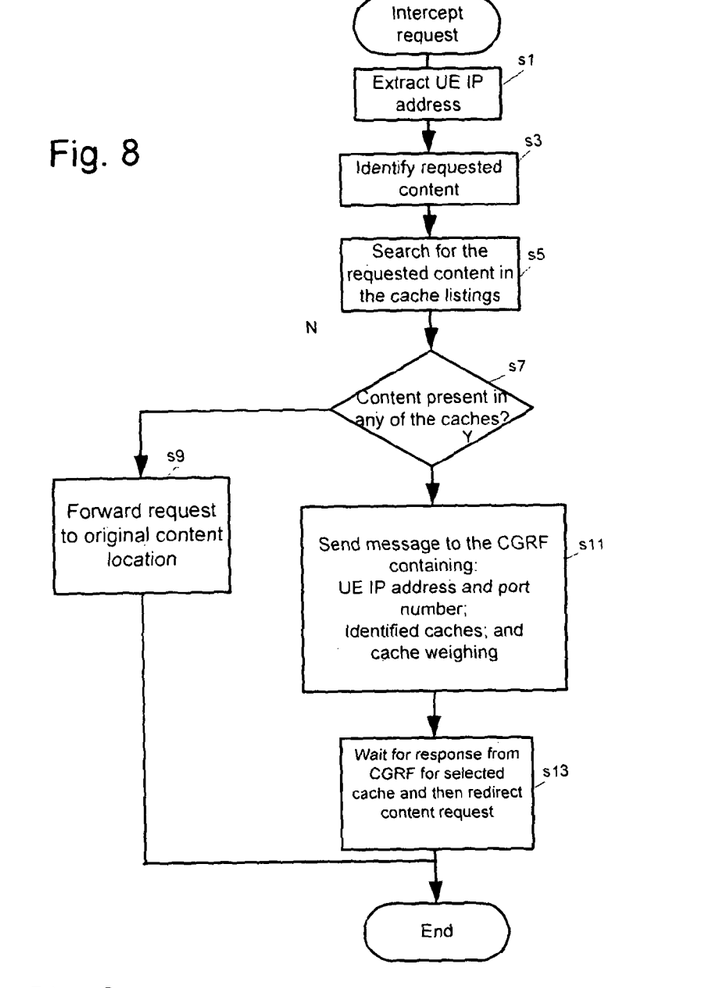
FIG. 8 is a flowchart showing the processing by the content locator when a request for content is received from a user device.

The processing of the content locator in response to a request for content from a user device will now be described with reference to FIG. 8.

Content requests from the user devices are intercepted by the device interface 41 and forwarded to the content request processor 43 which performs the following processing for each request. In step s1, the IP address of the user device is extracted from the request and placed into a temporary store. In step s3, the identity of the requested content is extracted.

Having learned the identity of the requested content, in step s5 the content request processor 43 checks whether the content is available in the content delivery network 7 by interrogating the content manager 33 and content directory 35.

The content request processor 43 waits for a response from the content manager 33 at step s7 and when a response is received, if the content is not available within the content delivery network 7, i.e. the content is not available within any content delivery cache 25, 27, the processing proceeds to step s9 where the user device request message is forwarded to the original destination of the content request.

However, if the response from the content manager 33 is positive, then processing proceeds to step s11 in which the content request processor 43 sends a message to the CGRF 23 via the CGRF interface 45.

Figure 9:
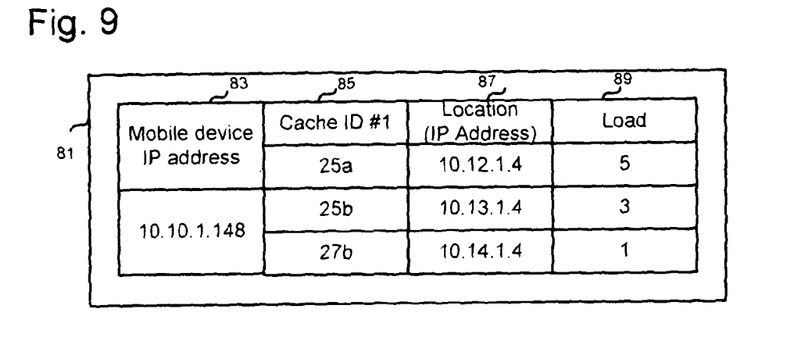
FIG. 9 shows the format of a message sent from the content locator to the CGRF.

The content manager 33 returns an indication not only of whether the content is available, but also the IP address of each content delivery cache which contains the content. FIG. 9 shows an example message in which three of the content delivery caches 25a, 25b and 27b have the requested content. The message 81 contains an address field 83 for the IP address of the mobile device 13, an identity field 85 for the identities of each content delivery cache containing the requested content an IP address field 87 for the associated IP addresses of each content delivery cache identified and a field 89 for the current load of each content delivery cache.

As will be described later, the CGRF 23 is responsible for making the final selection of which content delivery cache 25, 27 will serve the requested content. Therefore in step s13, the content request processor waits for a response from the CGRF 23 via the CGRF interface 45. The response will contain the identity of the selected content delivery cache and the content request processor 43 therefore redirects the content request to that selected content delivery cache.

All further data exchange between the user device 13 and the selected content delivery cache 25, 27 will bypass the content locator and therefore processing ends for the particular request.

Figures 10, 11:
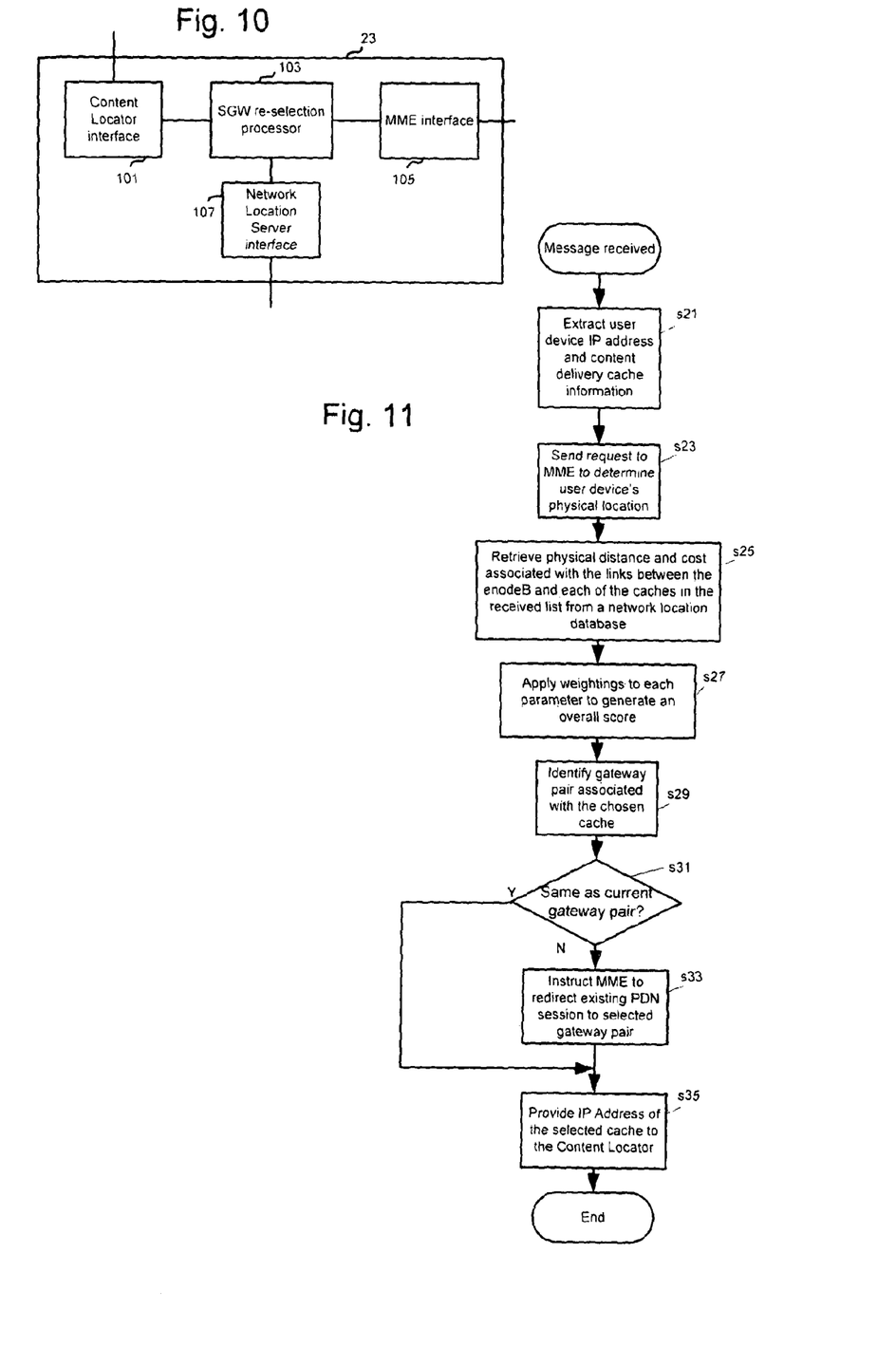
FIG. 10 schematically shows the functional components of a content gateway rules function (CGRF) module illustrated in FIG. 1.
FIG. 11 is a flowchart showing the processing performed by the CGRF when the content locator notifies it that a request for content has been received.

The message 81 generated by the content request processor is sent to the CGRF 23. FIG. 10 shows the functional components of the CGRF 23 containing a content locator interface 101, a gateway reselection processor 103, a MME interface 105 and a network location server interface 107.

The content locator interface 101 receives notifications from the content locator 29 and is also used to notify the content locator 29 which of the available content delivery caches has been selected. The gateway reselection processor 103 chooses a content delivery cache containing the requested content, and furthermore selects a different gateway pair 15 to service the data session. The MME 21 is notified of the selection via the MME interface 105.

The processing of gateway reselection processor 103 when a message 81 is received from the content locator 29 will be described with reference to FIG. 11.

In step s21 the IP address of the requesting user device 13 and content delivery cache information is extracted from the message 81. In step s23 the gateway reselection processor 103 sends a message containing the user device's IP address to the MME 21 requesting an indication of the user device's 13 geographical location.

In the example of FIG. 2, the IP address 10.10.1.148 is sent to the MME.

To save processing time, in this embodiment, the MME 21 returns the IP address of the eNodeB 9 that the user device 13 has connected to. In this example, the eNodeB IP address is 10.13.1.2.

Next, in step s25, the gateway reselection processor 103 sends a request containing the IF addresses of the eNodeB associated with the user device 13, and the IP addresses of all the content delivery caches containing the requested content to the network location server 24.

In the example, following IP addresses are sent to the network location server 24:

| | |
|---|---|
| eNodeB: | 10.13.1.2 |
| core content delivery cache 25a | 10.12.1.4 |
| core content delivery cache 25b | 10.13.1.4 |
| edge content delivery cache 27b | 10.14.1.4 |

The network location server 24 returns ranked scores relating to the physical distance (OR) and cost associated (CR) with the links between the user device 13 location and each content delivery cache 25, 27 containing the requested content.

Figure 12:
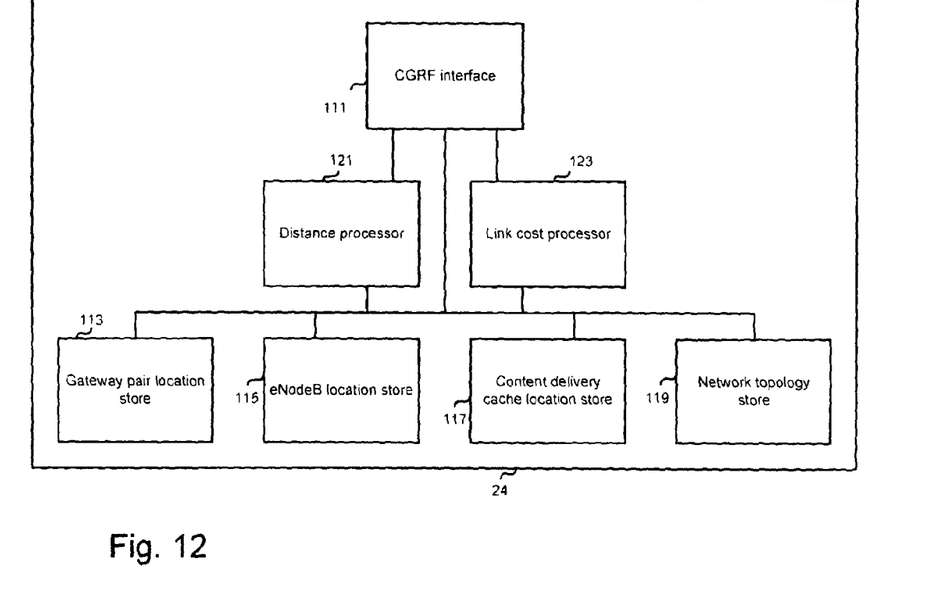
FIG. 12 schematically shows the functional components of a network location server illustrated in FIG. 1.

FIG. 12 shows the functional components of the network location server 24.

The network location server 24 includes a CGRF interface 111 for handling queries from the CGRF 23. In order to provide accurate location information, it also contains separate data stores for the various components in the network. These data stores are gateway pair location store 113, eNodeB location store 115, content delivery cache location store 117 and network topology store 119.

The gateway pair location store 113, eNodeB location store 115, content delivery cache location store 117 all contain IF address and geographical location coordinates for each respective stored entity. The network topology store 119 contains information on the layout and structure of the various networks and sub-networks as well as the properties of the links between the network components.

A distance processor 121 and Oink cost processor 123 take the input parameters from CGRF requests and generate the distance and cost ranked scores used by the CGRF 23. The processing of these units to generate the respective scores is conventional.

Returning to FIG. 11, in the example, network location server 24 returns the following information:

Distance Ranking

| | |
|---|---|
| core content delivery cache 25a | 10 |
| core content delivery cache 25b | 5 |
| edge content delivery cache 27b | 8 |

Cost Ranking

| | |
|---|---|
| core content delivery cache 25a | 7 |
| core content delivery cache 25b | 6 |
| edge content delivery cache 27b | 1 |

Once the network location server 24 has returned the distance and cost ranked scores, in step s27 the gateway reselection processor 103 applies weightings to the results in order to generate an overall score for each content delivery cache. The highest ranking content delivery cache, i.e., the one with the lowest cost is selected.

In this embodiment, the gateway reselection processor 103 applies the following formula:

Score=60%*CR+25%*DR+15%*load.

This results in the following final cost scores:

| | |
|---|---|
| core content delivery cache 25a | 7.45 |
| core content delivery cache 25b | 5.3 |
| edge content delivery cache 27b | 2.75 |

Therefore in the example, the edge content delivery cache 27b is selected.

The gateway reselection processor 103 now determines which gateway pair 15 would best service the data session with the user device 13 in delivering the requested content. In step s29 the identity of the gateway pair 15 associated with the highest ranking content delivery cache is determined by sending the address of the highest ranking content delivery cache to the network location server 24 and requesting the associated gateway pair.

In this example:
Edge content delivery cache 27b: 10.14.1.4 returns
PGW: 10.14.1.3
which is gateway pair 15c.

In step s31, a check is performed to determine whether the gateway pair 15 is the same as the current gateway pair 15 in use. If it is, then there is no need to move to a different gateway pair 15 and processing proceeds to step s35 where the SGW reselection processor 103 informs the content locator 29 of the identity of the selected content delivery cache. In the example, the current gateway pair is gateway pair 15a so processing continues.

If the test in step s31 determines that a different gateway pair 15 would be more suitable, then in step s33 the SGW reselection processor 103 informs the MME via the MME interface 105 to redirect the user device's current packet data network session away from the current gateway pair 15a and to the gateway pair 15c identified in step s29 using procedures such as TS23.401 Selected IP Traffic Offload (SIPTO). After this stage, the processing proceeds to step s35 as described earlier and then processing ends for the current request.

The processing of content locator and CGRF allows for data sessions between user devices and content delivery caches in a content distribution network 7 via an EPC to move in dependence on the location of the content delivery caches containing the requested content. In this way, the path between these network components can be optimised thereby improving the operation of the network as a whole.

ALTERNATIVES AND MODIFICATIONS

In the embodiment, the load of the each content delivery cache is factored into the calculation to select a content delivery cache. This is an optional feature and in an alternative, the content manager does not return this information.

In the embodiment, a particular selection algorithm was used to select the optimal SGW. It will be appreciated that many different equivalent algorithms could be used in order to identify an optimal SGW without departing from the scope of the invention.

In the embodiment, the CGRF was collocated with the MME. In an alternative, the CGRF is a separate entity within the EPC although communication via the interfaces is the same as in the first embodiment.

In the embodiment, the network core is a single EPC with many gateway pairs of SGWs and PGWS. It will be clear to the skilled person that many different EPC configurations are possible and therefore in an alternative there are multiple SGWs associated with any particular PGW. In a further alternative, there are multiple separate EPC networks all linked together under the control of several MMEs which are external to the EPC.

The invention claimed is:

1. A method of managing a data connection between a user device and a plurality of content caches in a cellular network formed of a plurality of base stations, a plurality of gateway servers and said plurality of content caches, each content cache being associated with one of the gateway servers, the user device and content caches being connected to the cellular network via a first base station and a first gateway server initially allocated to said first base station, the method being carried out by a gateway reselection apparatus within the cellular network and comprising:
  receiving a request for content data from the user device via the first base station and first gateway server,
  accessing data identifying a set of said plurality of content caches containing said requested content data;
  selecting one content cache from the set of content caches to serve the requested content data to the user device, said selection based on the proximity of the content cache to the geographic location of the user device;
  identifying a second gateway server associated with the selected content cache which is different from the first gateway server, and
  causing the data connection between the user device and the first gateway server to be transferred to the second gateway server associated with the selected content cache via the first base station, before the requested content data is transferred to the user device from the selected content cache via the second gateway server and first base station.

2. A method according to claim 1, further comprising receiving an indication of current load of each content cache in the set; and wherein the content cache selection is also based on the current load of each content cache.

3. A method according to claim 1, further comprising receiving an indication of network cost rankings for each content cache in the set; and wherein the content cache selection is also based on the network cost rankings associated with each content cache.

4. A method according to claim 1, further comprising determining the location of the user device.

5. A method according to claim 1, further comprising calculating the distance between the geographic location of the user device and the geographic location of each of the content caches in the identified set.

6. A method according to claim 1, wherein a content cache is the set is selected by:
receiving proximity metrics relating to the distance between the user device and each content cache in the set;
ranking said content caches in the set in accordance with the associated proximity metrics; and
identifying the content cache having the highest ranking.

7. A method according to claim 1 further comprising performing a content cache directory lookup for the requested content.

8. A method according to claim 1, wherein the user devices and gateway servers form part of a cellular data network operating in accordance with the Long Term Evolution cellular protocols.

9. Apparatus for managing a data connection between a user device and a plurality of content caches, in a cellular network formed of a plurality of base stations, a plurality of gateway servers and said plurality of content caches, each content cache being associated with one of the gateway servers, the user device and content caches being connected to the cellular network via a first base station and a first gateway server initially allocated to said first base station, the method being carried out by a gateway reselection apparatus within the cellular network, the apparatus comprising:
a receiver for receiving a request for content data from the user device via the first base station and first gateway server,
a content locator receiver for accessing data identifying a set of said plurality of content caches containing said requested content data;
a content cache selector for selecting one content cache from the set of content caches to serve the requested content data to the user device, said selection based on the proximity of the content cache to the geographic location of the user device;
a gateway identifier for identifying a second gateway server associated with the selected content cache which is different from the first gateway server; and
a gateway reselector for causing the data connection between the user device and the first gateway server to be transferred to the second gateway server associated with the selected content cache via the first base station, before the requested content data is transferred to the user device from the selected content cache via the second gateway server and first base station.

10. Apparatus according to claim 9, wherein the receiver is further configured to receive an indication of current load of each content cache in the set; and wherein the content cache selector is configured to select a content cache also based on the current load of each content cache.

11. Apparatus according to claim 9, wherein the receiver is further configured to receive an indication of network cost rankings for each content cache in the set; and wherein the content cache selection is also based on the network cost rankings associated with each content cache.

12. Apparatus according to claim 9, further comprising a locator for determining the location of the user device.

13. Apparatus according to claim 9, further comprising a distance calculator for calculating the distance between the geographic location of the user device and the geographic location of each of the content caches in the identified set.

14. Apparatus according to claim 9, wherein the content cache selector is configured to select a content cache by:
receiving proximity metrics relating to the distance between the user device and each content cache in the set;
ranking said content caches in the set in accordance with the associated proximity metrics; and
identifying the content cache having the highest ranking.

15. Apparatus according to claim 9 further comprising a content locator interface for performing a content cache directory lookup for the requested content.

16. Apparatus according to claim 9, wherein the apparatus is part of a cellular data network and the user devices and gateway servers form part of a cellular data network operating in accordance with the Long Term Evolution cellular protocols.

17. A cellular data communications network system comprising user devices, gateway servers, content caches and an apparatus as set out in claim 9.

* * * * *